(12) United States Patent
Yoshimura et al.

(10) Patent No.: US 9,935,578 B2
(45) Date of Patent: Apr. 3, 2018

(54) CONTROL DEVICE OF POWER CONVERTER, POWER CONVERSION SYSTEM, COMPRESSOR DRIVING SYSTEM, FLYWHEEL POWER GENERATION SYSTEM, AND CONTROL METHOD FOR POWER CONVERTER

(71) Applicant: Hitachi, Ltd., Chiyoda-ku, Tokyo (JP)

(72) Inventors: Masatoshi Yoshimura, Tokyo (JP); Naohiro Kusumi, Tokyo (JP); Noriaki Hino, Tokyo (JP); Tomofumi Shiraishi, Tokyo (JP); Aung Ko Thet, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 15/615,585

(22) Filed: Jun. 6, 2017

(65) Prior Publication Data
US 2017/0359014 A1 Dec. 14, 2017

(30) Foreign Application Priority Data
Jun. 14, 2016 (JP) .................................. 2016-117577

(51) Int. Cl.
*G05B 5/01* (2006.01)
*H02P 29/50* (2016.01)

(52) U.S. Cl.
CPC ............... *H02P 29/50* (2016.02); *G05B 5/01* (2013.01)

(58) Field of Classification Search
CPC ............... Y02T 10/645; Y02T 10/7275; Y02T 10/6239; Y02T 10/6217; Y02T 10/6286; Y02T 10/644; Y02T 10/70; Y02T 10/7077; Y02T 10/725; Y02T 10/7258; B60L 15/20; B60L 2240/421; B60L 2240/423; B60L 2270/01
USPC .................................... 318/400.21, 460, 611
See application file for complete search history.

(56) References Cited

U.S. PATENT DOCUMENTS

| 8,626,394 B2 * | 1/2014 | Kezobo | B62D 5/0472 180/443 |
| 2005/0247503 A1 * | 11/2005 | Imazu | B60K 6/365 180/300 |
| 2006/0061317 A1 * | 3/2006 | Shibata | H02P 29/50 318/611 |

(Continued)

FOREIGN PATENT DOCUMENTS

JP 2004-187380 A 7/2004

*Primary Examiner* — Paul Ip
(74) *Attorney, Agent, or Firm* — Crowell & Moring LLP

(57) ABSTRACT

A control device of a power converter controls a system including a converter that converts alternating current (AC) power of a power supply into direct current (DC) power, an inverter that converts the DC power into AC power, a capacitor that is charged with and discharges the DC power, and a rotary electric machine that is driven by the AC power supplied from the inverter or regenerates the AC power to the power supply, the control device including: a vibration suppression control unit that outputs a torque current command correction value for canceling an axial vibration component due to a vibration frequency of a transmission system including the rotary electric machine and an output compensation control unit that outputs a correction value for suppressing AC power of the power supply fluctuated by the vibration suppression control unit to a voltage control unit of the converter.

9 Claims, 6 Drawing Sheets

(56) References Cited

U.S. PATENT DOCUMENTS

| | | | |
|---|---|---|---|
| 2007/0138986 A1* | 6/2007 | Kutsuna | B60K 6/365 318/400.21 |
| 2008/0116832 A1* | 5/2008 | Yamada | B60L 15/02 318/460 |
| 2012/0016549 A1* | 1/2012 | Katsumata | B60K 6/46 701/22 |
| 2012/0185132 A1* | 7/2012 | Kezobo | B62D 5/0472 701/41 |
| 2012/0245773 A1* | 9/2012 | Suzuki | B60L 15/20 701/22 |
| 2013/0184918 A1* | 7/2013 | Motosugi | B60L 15/20 701/22 |
| 2013/0231838 A1* | 9/2013 | Shiozawa | B60L 3/102 701/70 |
| 2014/0288758 A1* | 9/2014 | Suzuki | B60L 15/2009 701/22 |

\* cited by examiner

CONTROL DEVICE OF POWER CONVERTER, POWER CONVERSION SYSTEM, COMPRESSOR DRIVING SYSTEM, FLYWHEEL POWER GENERATION SYSTEM, AND CONTROL METHOD FOR POWER CONVERTER

BACKGROUND OF THE INVENTION

1. Field of the Invention

The present invention relates to a control device of a power converter, a power conversion system, a compressor driving system, a flywheel power generation system, and a control method for a power converter.

2. Description of the Related Art

A rotary electric machine driving system that drives a rotary electric machine at a variable speed and operates loads such as a fan, a pump, and a compressor has generally used a power converter that can control frequency and power of an alternating current (AC) power supply. The power converter converts AC power of the power supply into DC power using a converter, and converts the DC power into AC power using an inverter and supplies the AC power to the rotary electric machine. The converter controls a DC voltage to be constant, and the inverter controls the number of revolutions or an output of the rotary electric machine.

In recent years, in order to effectively utilize the energy of the loads, the rotary electric machine driving system using the power converter may control a rotation speed or a torque of the rotary electric machine to perform an operation of regenerating energy to the AC power supply through the power converter. At this point, the power supplied from the AC power supply or regenerated to the AC power supply is proportional to the rotation speed and the torque of the rotary electric machine.

In a driving system of a two-mass system or a multi-mass system having a resonance system, such as the system for driving the loads by the rotary electric machine, a vibration component having a specific frequency may be generated. A natural frequency, which is the frequency of the vibration, is unique to equipment, and in the driving of the power converter, there is a need to control the vibration of the natural frequency so that the vibration of the natural frequency does not adversely affect the system.

As technology for suppressing the vibration component, for example, JP 2004-187380 A discloses technology of calculating an inertia control signal from a motor acceleration torque signal that is obtained by multiplying a signal, obtained by differentiating a motor average speed signal, by an inertia time constant of a motor part, calculating a torque command compensation signal from a deviation signal between the inertia control signal and the motor acceleration torque signal, and controlling a current of the motor so as to obtain a motor torque according to a torque command that is a sum of the torque command signal and the torque command compensation signal.

SUMMARY OF THE INVENTION

In the above-mentioned related art, the vibration component can be suppressed by calculating the torque command compensation signal and controlling the current of the motor so as to obtain the motor torque according to the torque command that is the sum of the torque command signal and the torque command compensation signal. However, the torque of the rotary electric machine is fluctuated at the time of suppressing the vibration component, and therefore, the power supplied from the AC power supply or regenerated to the AC power supply is fluctuated according to the fluctuation of the torque of the rotary electric machine.

The present invention has been made in view of the above problems, and an object of the present invention is to provide a control device of a power converter, a power conversion system, a compressor driving system, a flywheel power generation system, and a control method for a power converter capable of simultaneously suppressing vibration of a driving system and fluctuation of power supplied from an AC power supply or regenerated to the AC power supply.

In order to achieve the above object, the present invention controls a system including a converter that converts alternating current (AC) power of a power supply into direct current (DC) power, an inverter that converts the DC power into AC power, a capacitor that is installed between the converter and the inverter and is charged with and discharges the DC power, and a rotary electric machine that is driven by the AC power supplied from the inverter or regenerates the AC power to the power supply through the inverter and the converter, and there are provided: an inverter control unit that controls the inverter; a converter control unit that controls the converter; a vibration suppression control unit that calculates a vibration correction value for canceling an axial vibration component clue to a vibration frequency of a transmission system including the rotary electric machine; and an output compensation control unit that calculates a fluctuation correction value for suppressing AC power of the power supply fluctuated by the vibration suppression control unit, wherein the inverter control unit is configured to be operated based on a command value corrected by the vibration correction value and the converter control unit is configured to be operated based on a command value corrected by the fluctuation correction value.

According to an embodiment of the present invention, the vibration of the driving system and the fluctuation of the power supplied from the AC power supply or regenerated to the AC power supply can be simultaneously suppressed.

DESCRIPTION OF THE PREFERRED EMBODIMENTS

Hereinafter, modes for carrying out the present invention (hereinafter, referred to as "embodiments") will be described with reference to the accompanying drawings.

(First Embodiment) <Overview of Configuration and Operation of First Embodiment>

A control device of a power converter according to a first embodiment of the present invention will be described with reference to FIG. 1.

Figure 1:
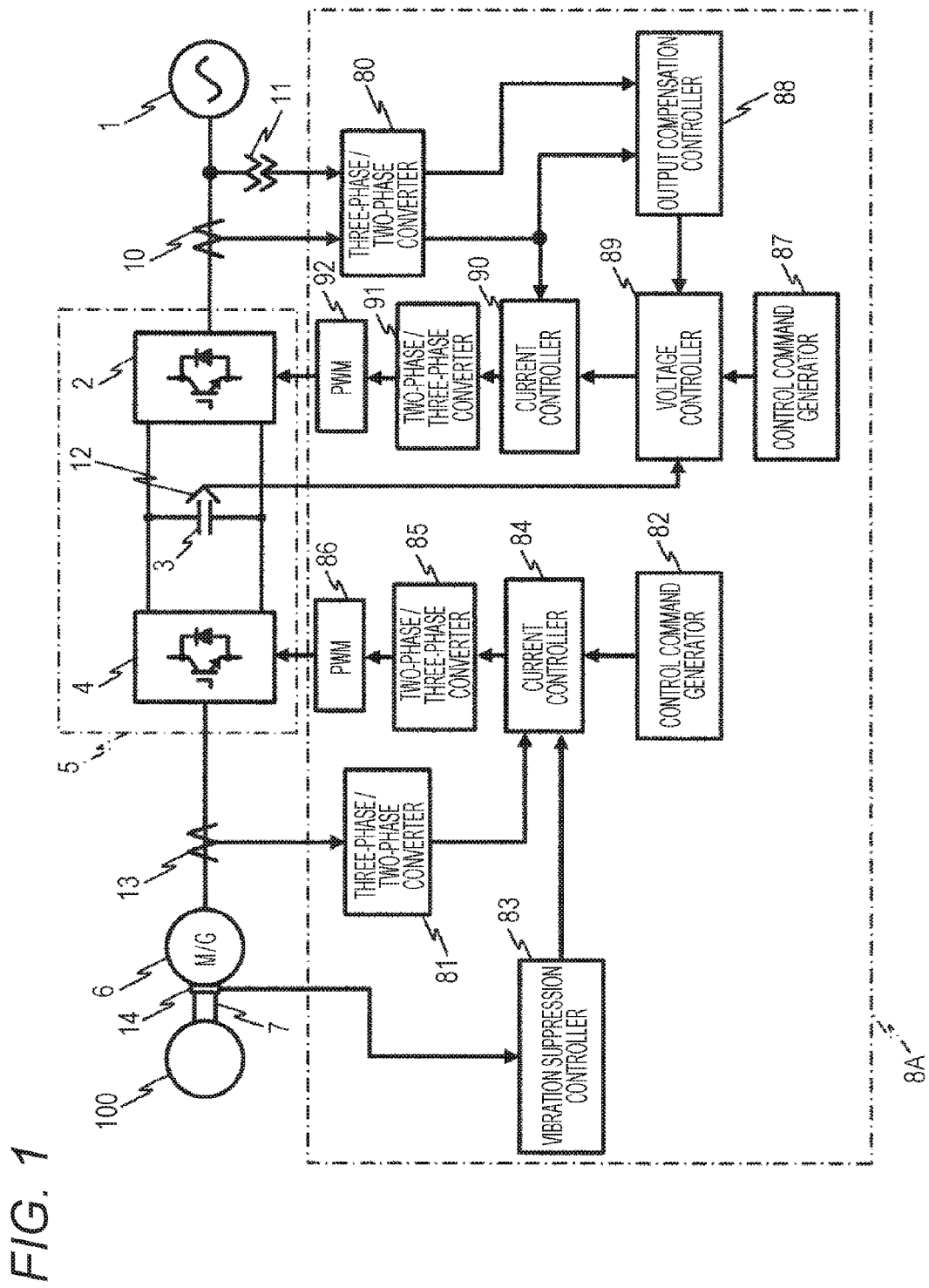
FIG. 1 is a diagram illustrating an exemplary configuration of a control device of a power converter according to a first embodiment of the present invention and a relationship between the power converter and a rotary electric machine.

FIG. 1 illustrates an exemplary configuration of a control device 8A of a power converter according to a first embodiment of the present invention, and illustrates a relationship between a rotary electric machine 6 and a power converter 5 including a converter 2, a capacitor 3, and an inverter 4.

<Configuration of Rotary Electric Machine Driving System According to First Embodiments>

First, a configuration and an operation of a driving system (rotary electric machine driving system) for the rotary electric machine 6 using the power converter 5 will be described.

In FIG. 1, the rotary electric machine driving system includes an alternating current (AC) power supply 1, the converter 2 that converts AC power input and output by the AC power supply 1 into DC power, the capacitor 3 that is charged with and discharges the DC power, the inverter 4 that converts the DC power into the AC power having any frequency, the rotary electric machine 6 that receives the power supplied from the inverter 4, a load 100 that is mechanically connected to the rotary electric machine 6 via a rotating shaft 7, and the control device 8A that controls the converter 2 and the inverter 4. Note that the AC power supply 1 may be a system that may output AC power from a direct current (DC) power supply such as a storage battery through an inverter, in addition to an AC power supply having a commercial frequency such as a power system.

A current detection sensor 10 detects a three-phase AC current between the AC power supply 1 and the converter 2 and transmits signals of the three-phase AC current to the control device 8A. A voltage detection sensor 11 detects a three-phase AC voltage between the AC power supply 1 and the converter 2 and transmits signals of the three-phase AC voltage to the control device 8A. A voltage detection sensor 12 detects a DC voltage between terminals of the capacitor 3 (DC voltage $V_{DC}(t)$ between the terminals of the capacitor) and transmits a signal of the DC voltage to the control device 8A. A current detection sensor 13 detects a three-phase AC current between the inverter 4 and the rotary electric machine 6 and transmits signals of the three-phase AC current to the control device 8A.

The rotary electric machine 6 is driven at a predetermined rotation speed (number of revolutions/unit time) and an output voltage (power) by the AC (voltage) power. That is, the rotary electric machine 6 is driven at a rotary electric machine torque $T_M(t)$, and the load 100 is operated at a load torque $T_{LOAD}(t)$ by receiving and transferring mechanical energy. A rotation speed detection sensor 14 detects a rotation of the rotary electric machine 6 and transmits a signal ω (rotation speed information) of the rotation of the rotary electric machine 6 to the control device 8A.

Here, the AC power supply 1 responds at input/output power $P_{AC}(t)$.

<Overview of Configuration and Operation of Control Device 8A>

In FIG. 1, the control device (control device of a power converter) 8A includes three-phase/two-phase converters 80 and 81, control command generators 82 and 87, a vibration suppression controller 83, current controllers 84 and 90, two-phase/three-phase converters 85 and 91, pulse width modulations (PWMs) 86 and 92, an output compensation controller 88, and a voltage controller 89.

Three-phase AC values detected by the current detection sensor 10 and the voltage detection sensor 11 are converted into biaxial components by the three-phase/two-phase converter 80, and three-phase AC values detected by the current detection sensor 13 are converted into biaxial components by the three-phase/two-phase converter 81.

Here, in FIG. 1, the respective functions of the control device 8A are illustrated by control blocks, but may be configured of different control circuits and may also serve as software in an electronic computer.

The control command generator 82 generates and outputs a control command (control command value), which allows the inverter 4 to convert a DC voltage (power) into an AC voltage, based on a torque command $T(t)^*$. The control command is calculated based on command values such as the output, the rotation speed, and the torque of the rotary electric machine 6 and is output as a command value of a current so that the rotary electric machine 6 outputs the torque command $T(t)^*$.

The vibration suppression controller 83 inputs the rotation speed information output from the rotation speed detection sensor 14 and extracts a specific frequency component from the input signal. The specific frequency component is set as a natural frequency generated in the driving system of the rotary electric machine 6, the rotating shaft 7, and the load 100. To suppress a vibration component of the natural frequency, a gain and a phase of an output of the vibration suppression controller 83 are adjusted and then the adjusted gain and phase are output as current correction values. Here, the vibration suppression controller 83 outputs the current correction value to the current controller 84, but in systems having different configurations, other types of correction values may be used as long as they can suppress vibration, which are collectively called a vibration correction value.

The current controller 84 calculates a current command value output from the control command generator 82 with an appropriate voltage with reference to a current signal output from the three-phase/two-phase converter 81 and a current correction value of the vibration suppression controller 83 to output the voltage command value.

The two-phase/three-phase converter 85 converts a biaxial voltage command value output from the current controller 84 into a three-phase voltage command value and inputs the three-phase voltage command value to the control pulse generator 86, and the PWM outputs a gate pulse signal to the inverter 4. The inverter 4 receives the gate pulse signal and outputs a voltage according to a command by switching a switching element such as an IGBT.

The control system as described above can control the output, the rotation speed, the torque, and the like, of the rotary electric machine to be desired values while suppressing the vibration due to the natural frequency of the driving system of the rotary electric machine 6, the rotating shaft 7, and the load 100.

Meanwhile, the control command generator 87 generates and outputs a control command (control command value) that allows the converter 2 to converter the AC voltage (power) into the DC so that a DC voltage $V_{DC}$ between the terminals of the capacitor is equal to a target DC voltage $V_{DC}$*. The control command is calculated based on the command value of the voltage of the capacitor 3 and is output as the command value of the voltage.

The output compensation controller 88 outputs a correction component of the DC voltage command transmitted to the voltage controller 89. The output compensation controller 88 detects active power output from the AC power supply 1 based on the biaxial component signal output from the three-phase/two-phase converter 80 and extracts any specific frequency component of which the output fluctuation is to be suppressed using a low-pass filter, Fourier transform, or the like. In the frequency component, a frequency range of the active power fluctuated in the inverter 4 is set by the vibration suppression control. Here, the output compensation controller 88 outputs the correction component of the DC voltage command value to the voltage controller 89, but in systems having different configurations, other types of correction values may be used as long as they can suppress the fluctuation of the AC power supply 1, which are collectively called a fluctuation correction value.

The voltage controller 89 calculates a control command from the control command generator 87 with an appropriate current with reference to a detection signal of the DC voltage detected by the voltage detection sensor 12 and an output signal of the output compensation controller 88 to output the current command value.

The current controller 90 calculates the current command value output from the voltage controller 89 with an appropriate voltage with reference to a current signal output from the three-phase/two-phase converter 80 to output the voltage command value.

The two-phase/three-phase converter 91 converts a biaxial voltage command value output from the current controller 90 into a three-phase voltage command value and inputs the three-phase voltage command value to the control pulse generator 92, and the PWM outputs the gate pulse signal to the converter 2. The converter 2 receives the gate pulse signal and outputs a voltage according to the command by switching a switching element such as an IGBT.

By the control system as described above, a voltage between the terminals of the capacitor 3 can be controlled by the converter 2 so that fluctuation of AC power between the AC power supply 1 and the converter 2 is suppressed.

<Description of Operation of First Embodiment>

Next, the effects of the first embodiment will be described with reference to FIGS. 2A to 2E. FIGS. 2A to 2E are waveform diagrams of the torque command T(t)*, the rotary electric machine torque $T_M(t)$, the load torque $T_{LOAD}(t)$, the DC voltage $V_{DC}(t)$ between the terminals of the capacitor, and the input/output power $P_{AC}(t)$ of the AC power supply, respectively. In the diagrams, solid lines indicate the waveforms of the present embodiment and broken lines indicate the waveforms of Comparative Example. Here, the "Comparative Example" corresponds to an example in which the converter 2 is controlled with a control function of suppressing axial vibration but without the control function of suppressing the fluctuation of the AC power.

Figure 2A:
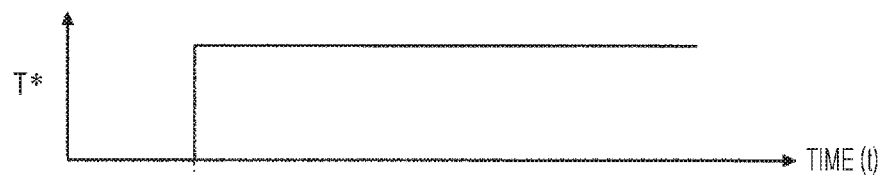
FIGS. 2A to 2E are diagrams illustrating exemplary effects of the control device of a power converter according to the first embodiment of the present invention in detail.
Figure 2B:
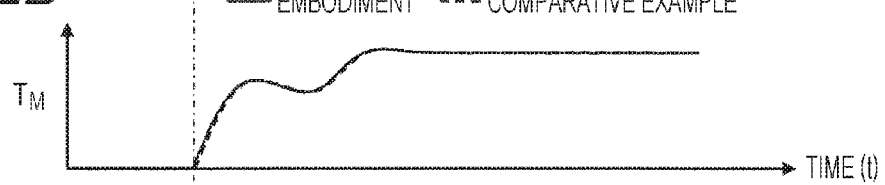
Figure 2C:
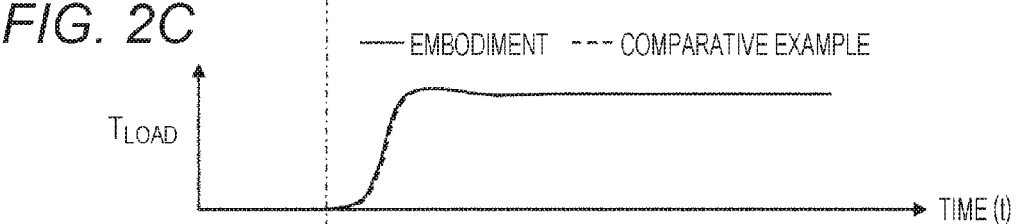

As illustrated in FIG. 2A, when the control command generator 82 of the control device 8A inputs a signal based on a stepped torque command to the current controller 84 at time t10, as illustrated in FIG. 2B, the rotary electric machine torque $T_M(t)$ of the rotary electric machine 6 does not become a simple first-order lag. The load torque $T_{LOAD}(t)$ applied to the load 100 is generated by transmitting the torque of the rotary electric machine 6 to the load 100 via the rotating shaft 7. At this point, in the load torque $T_{LOAD}(t)$, vibration occurs at a period of the natural frequency of the driving system. Since the vibration suppression controller 83 outputs the correction signal to the current controller 84 to suppress the vibration of the period, as illustrated in FIG. 2C, in the load torque $T_{LOAD}(t)$, the vibration of the period of the natural frequency of the driving system hardly occurs. However, due to the influence of the correction signal of the vibration suppression controller 83, as illustrated in FIG. 2B, the rotary electric machine torque $T_M(t)$ does not become the simple first-order lag but fluctuates.

Figure 2D:
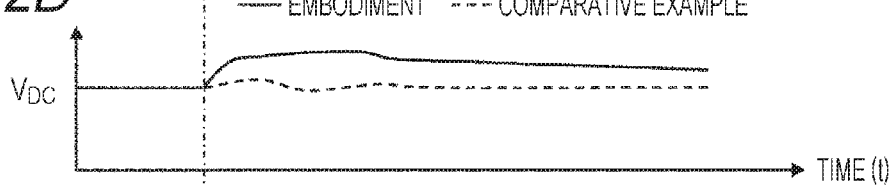
Figure 2E:
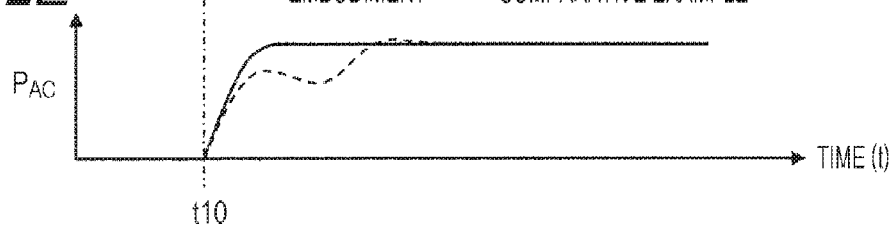

According to the comparative example, as illustrated in FIG. 2D, since the converter 2 is controlled so that the DC voltage $V_{DC}(t)$ between the terminals of the capacitor is constant, the DC voltage $V_{DC}(t)$ is substantially constant even when the rotary electric machine torque $T_M(t)$ fluctuates. Since the output of the rotary electric machine is proportional to the torque and the rotation speed, the input/output power of the AC power supply 1 and the torque of the rotary electric machine 6 are proportional to each other. For this reason, as illustrated in FIGS. 2B and 2E, characteristics of the input/output power $P_{AC}(t)$ of the AC power supply are close to those of the rotary electric machine torque $T_M(t)$. Therefore, when the rotary electric machine torque $T_M(t)$ fluctuates by the axial vibration suppression control, the input/output power $P_{AC}(t)$ of the AC power supply also fluctuates.

Meanwhile, according to the present embodiment, since the output compensation controller 88 controls the fluctuation of the AC power between the AC power supply 1 and the converter 2 to be suppressed, as illustrated in FIG. 2D, the DC voltage $V_{DC}(t)$ between the terminals of the capacitor fluctuates to suppress the fluctuation of the input/output power $P_{AC}(t)$ of the AC power supply. As a result, as illustrated in FIG. 2E, the fluctuation of the input/output power $P_{AC}(t)$ of the AC power supply is suppressed.

As described above, it is possible to simultaneously suppress the vibration of the driving system and the fluctuation of the power supplied from the AC power supply or regenerated to the AC power supply.

(Second Embodiment) (Suppression Control of Output Fluctuation by Difference Between Control Command Value and Measurement Value Next, a control device of a power converter according to a second embodiment of the present invention will be described with reference to FIG. 3. In modifications of the first embodiment, parts different from those of the first embodiment will mainly be described. Therefore, parts that are not described in other embodiments such as the second embodiment are the same as those described in the first embodiment.

Figure 3:
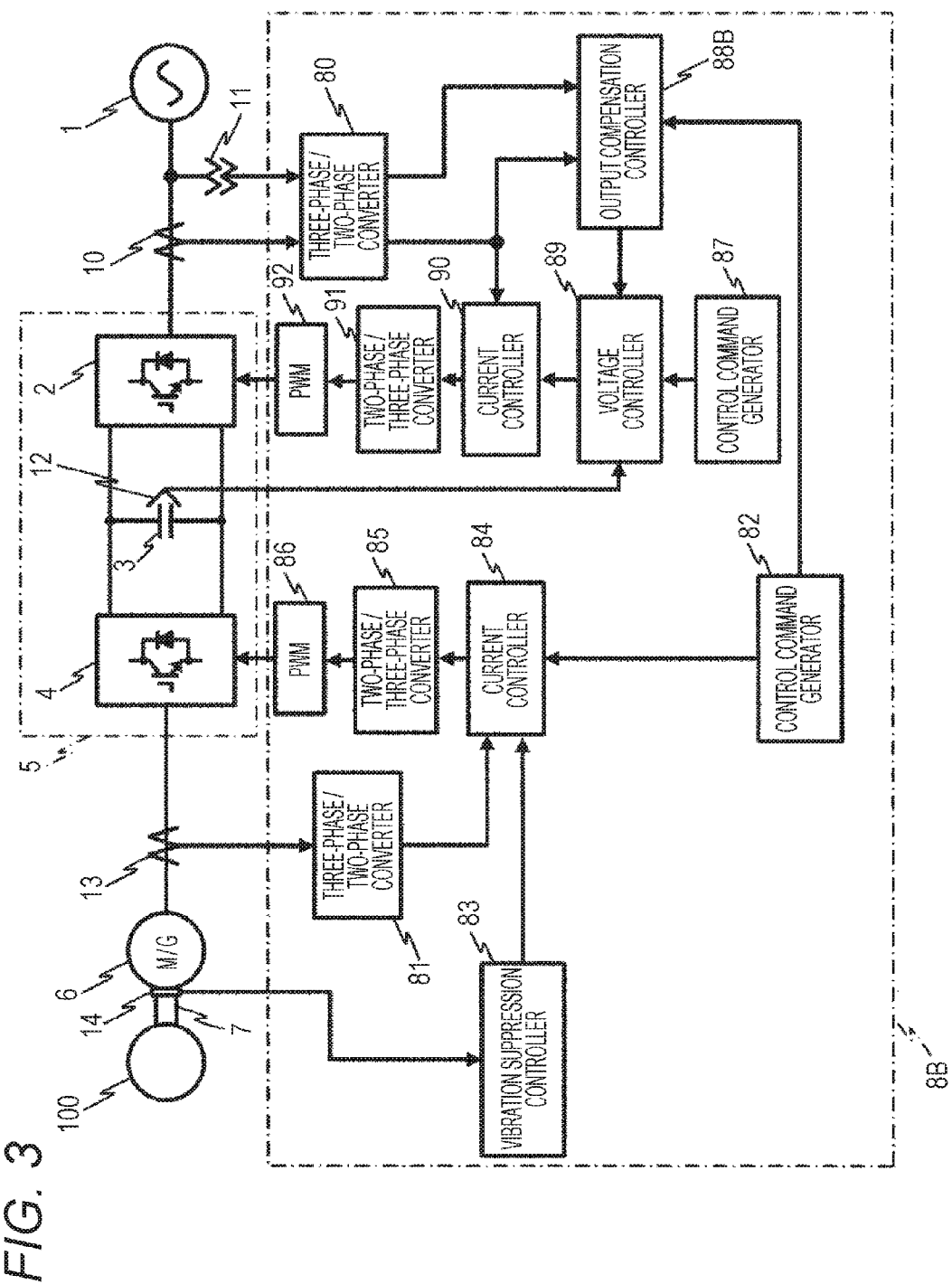
FIG. 3 is a diagram illustrating an exemplary configuration of a control device of a power converter according to a second embodiment of the present invention and a relationship between the power converter and a rotary electric machine.

FIG. 3 illustrates an exemplary configuration of a control device 8B of a power converter according to the second embodiment of the present invention, and illustrates a relationship between a rotary electric machine 6 and a power converter 5 including a converter 2, a capacitor 3 and an inverter 4.

In FIG. 3, the difference from FIG. 1 is an output compensation controller 88B in the control device 8B of a power converter.

That is, the output compensation controller 88B outputs a correction signal to a voltage controller 89, based on a difference between the command value signal of a control command generator 82 and the active power calculated from the signal of the biaxial component output from a three-phase/two-phase converter 80.

By adopting the configuration, there is no need to extract the fluctuation of the active power output from an AC power supply 1 using a low-pass filter, or the like, and therefore, the configuration of the output compensation controller 88B is simple and the frequency range in which the output fluctuation is suppressed is wide.

(Third Embodiment) (Output Fluctuation Compensation of AC Power Supply from Measurement Value of Rotary Electric Machine)

Next, a control device of a power converter according to a third embodiment of the present invention will be described with reference to FIG. 4.

Figure 4:
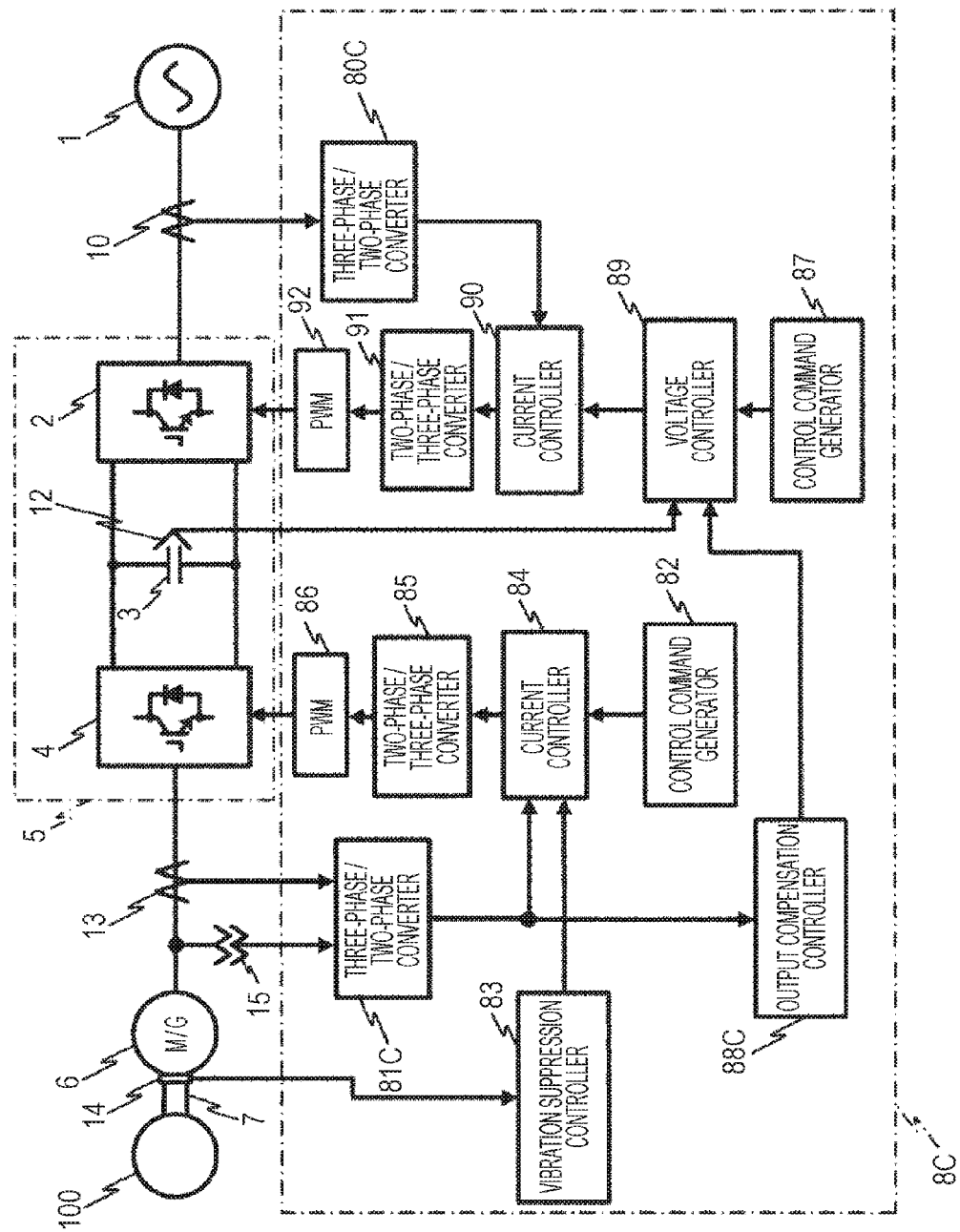
FIG. 4 is a diagram illustrating an exemplary configuration of a control device of a power converter according to a third embodiment of the present invention and a relationship between the power converter and a rotary electric machine.

FIG. 4 illustrates an exemplary configuration of a control device 8C of a power converter according to the third embodiment of the present invention, and illustrates a relationship between a rotary electric machine 6 and a power converter 5 including a converter 2, a capacitor 3 and an inverter 4.

In FIG. 4, the difference from FIG. 1 is that the voltage detection sensor 11 between the AC power supply 1 and the converter 2 is removed, a voltage detection sensor 15 is newly provided between the inverter 4 and the rotary electric machine 6, and an input of an output compensation controller 88C is an output of a three-phase/two-phase converter 81C.

That is, the output compensation controller 88C detects the active power between the inverter 4 and the rotary electric machine 6 based on the current signal and the voltage signal of the biaxial component output from the three-phase/two-phase converter 81C and extracts any specific frequency component of which the output fluctuation is to be suppressed using a low-pass filter, Fourier transform, or the like.

In FIG. 4 illustrating the third embodiment, anything other than the above-mentioned difference is the same as FIG. 1 illustrated in the first embodiment, and therefore, a duplicate description thereof will be omitted.

By adopting the configuration of FIG. 4, it is not necessary to extract the fluctuation component of the active power caused by the vibration suppression controller 83 from the AC power supply 1 and the converter 2. By doing so, the frequency component of the output fluctuation caused by the vibration suppression control and the frequency component of the output fluctuation caused by the AC power supply 1 may be separated from each other, and therefore, it is possible to effectively suppress the output fluctuation caused by the vibration suppression control.

Fourth Embodiment (First Embodiment+DC Voltage Fluctuation Compensation)

Next, a control device of a power converter according to a fourth embodiment of the present invention will be described with reference to FIG. 5.

Figure 5:
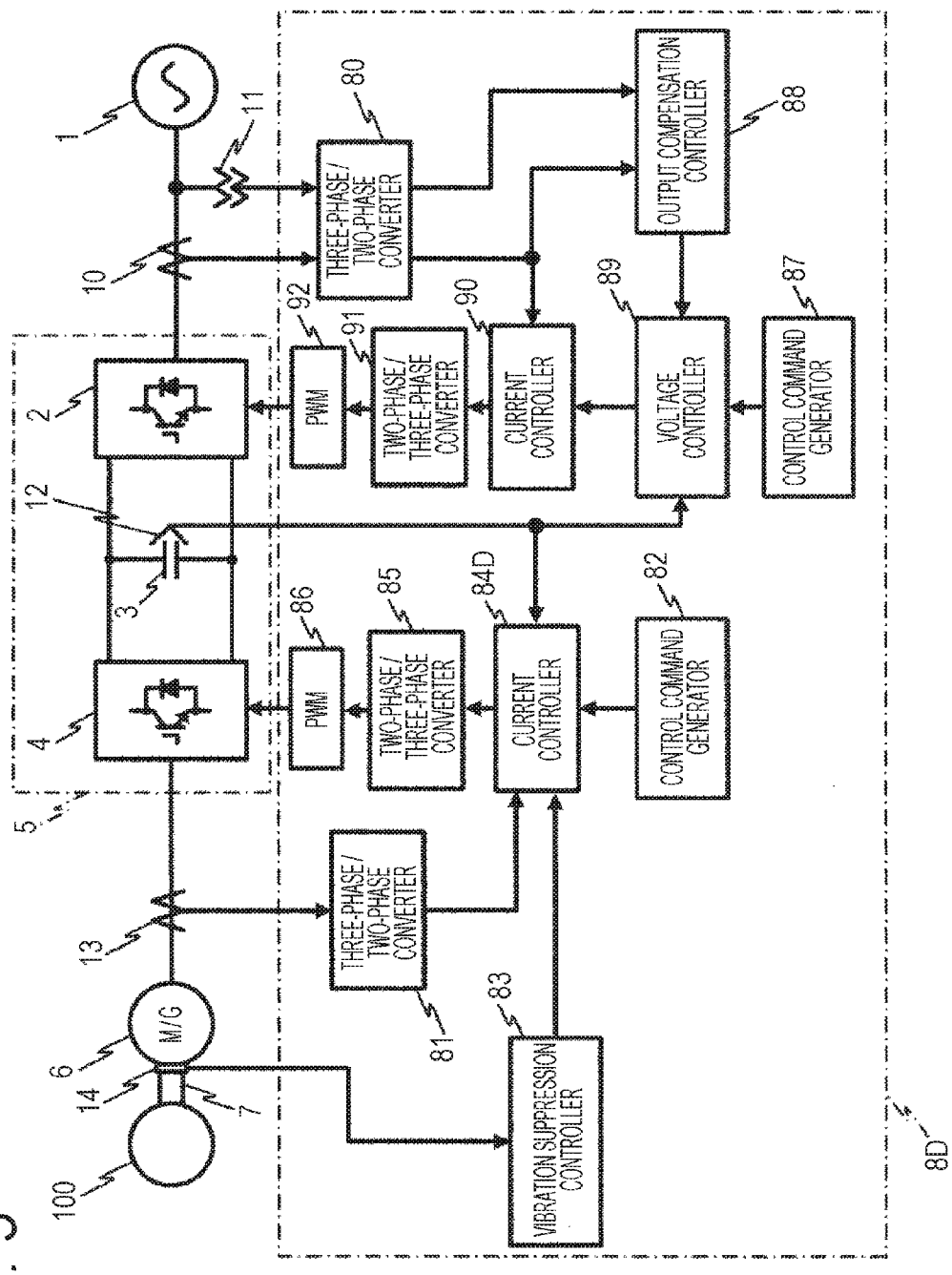
FIG. 5 is a diagram illustrating an exemplary configuration of a control device of a power converter according to a fourth embodiment of the present invention and a relationship between the power converter and a rotary electric machine.

FIG. 5 illustrates an exemplary configuration of a control device 8D of a power converter according to the fourth embodiment of the present invention, and illustrates a relationship between a rotary electric machine 6 and a power converter 5 including ae converter 2, a capacitor 3, and an inverter 4.

In FIG. 5, the difference from FIG. 1 is a current controller 84D in the control device 8D of a power converter.

That is, the current controller 84D calculates the current command value output from a control command generator 82 with an appropriate voltage with reference to the detection signal of the DC voltage detected by a voltage detection sensor 12 in addition to the current signal output from a three-phase/two-phase converter 81 and the current correction value of a vibration suppression controller 83 to output the voltage command value.

In FIG. 5 illustrating the fourth embodiment, anything other than the current controller 84D is the same as FIG. 1 illustrated in the first embodiment, and therefore, a duplicate description thereof will be omitted.

In the fourth embodiment, when the detection signal of the DC voltage increases, the correction component of the voltage command value of the current controller 84D increases in a negative direction to suppress an increment in the AC power output from the inverter 4 to the rotary electric machine 6 due to the increase in the DC voltage.

On the contrary, when the detection signal of the DC voltage decreases, the correction component of the voltage command value of the current controller 84D increases in a positive direction to suppress a decrement in the AC power output from the inverter 4 to the rotary electric machine 6 due to the decrease in the DC voltage.

In this way, it is possible to suppress the fluctuation of the AC power between the inverter 4 and the rotary electric machine 6 that is caused by the fluctuation of the DC voltage between the terminals of the capacitor 3. This fluctuation is caused by the output compensation control of an output compensation controller 88.

Although the control device 8D of a power converter of FIG. 5 has been described with reference to the difference from the control device 8A of a power converter of FIG. 1, the current controller 84D of the control device 8D of a power converter may be replaced by the current controller 84 of the control device 8B or 8C of a power converter.

Fifth Embodiment (Control Device Built in Power Converter)

Next, a power converter according to a fifth embodiment of the present invention will be described.

In FIGS. 1, 3, 4, and 5, although the control devices 8A, 8B, 8C, and 8D of a power converter have been each described as a separate device from the power converter 5, the power converter 5 may include the control devices 8A, 8B, 8C, and 8D of a power converter as a part thereof.

In this way, it is possible to obtain an effect that the power converter 5 including one of the control devices 8A, 8B, 8C, and 8D becomes a power converter that can suppress the vibration due to the natural frequency of the driving system of the rotary electric machine 6, the rotating shaft 7, and the load 100 and the fluctuation of the AC power between the AC power supply 1 and the converter 2.

(Sixth Embodiment) (Compressor Driving System)

Next, a configuration of a compressor driving system according to a sixth embodiment of the present invention will be described with reference to FIG. 6.

Figure 6:
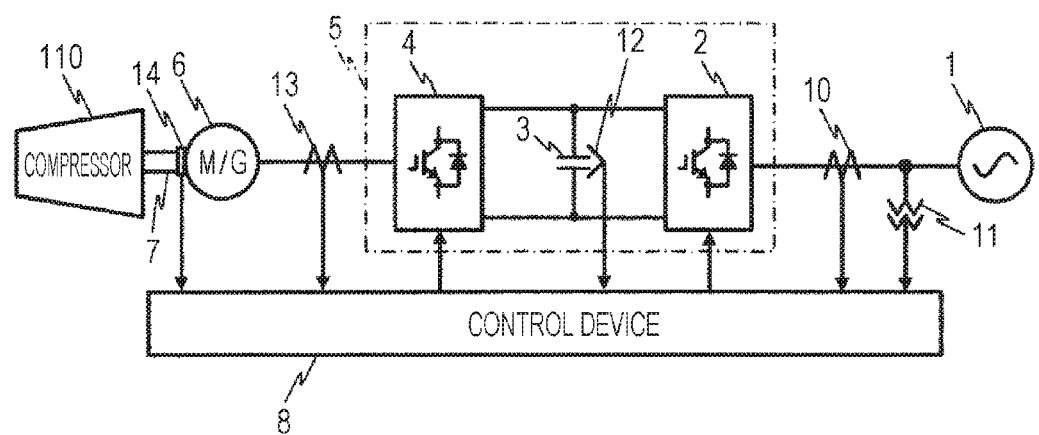
FIG. 6 is a diagram illustrating an exemplary configuration of a compressor driving system according to a sixth embodiment of the present invention.

FIG. 6 is a diagram illustrating an exemplary configuration of the compressor driving system according to the sixth embodiment of the present invention.

In FIG. 6, an AC power supply 1, a converter 2, a capacitor 3, an inverter 4, a rotary electric machine 6, a rotating shaft 7, current detection sensors 10 and 13, voltage detection sensors 11 and 12, and a rotation speed detection sensor 14 are the same as the constituent elements denoted by the same reference numerals in FIG. 1.

Furthermore, a control device 8 corresponds to the control device 8A in FIG. 1.

A compressor 110 in FIG. 6 is driven by the rotary electric machine 6 via the rotating shaft 7.

The compressor driving system requires high reliability in a variable speed operation and requires high stability that the AC power input and output to and from the AC power supply such as the power system is less fluctuated.

By using the control devices 8A to 8D of a power converter according to the first to fourth embodiments of the present invention, it is possible to provide the compressor driving system having high reliability that the vibration due to the natural frequency of the driving system is suppressed and having high stability that the fluctuation of the AC power input and output to and from the AC power supply such as the power system is suppressed.

(Seventh Embodiment) (Flywheel Power Generation System)

Next, a configuration of a flywheel power generation system according to a seventh embodiment of the present invention will be described with reference to FIG. 7.

Figure 7:
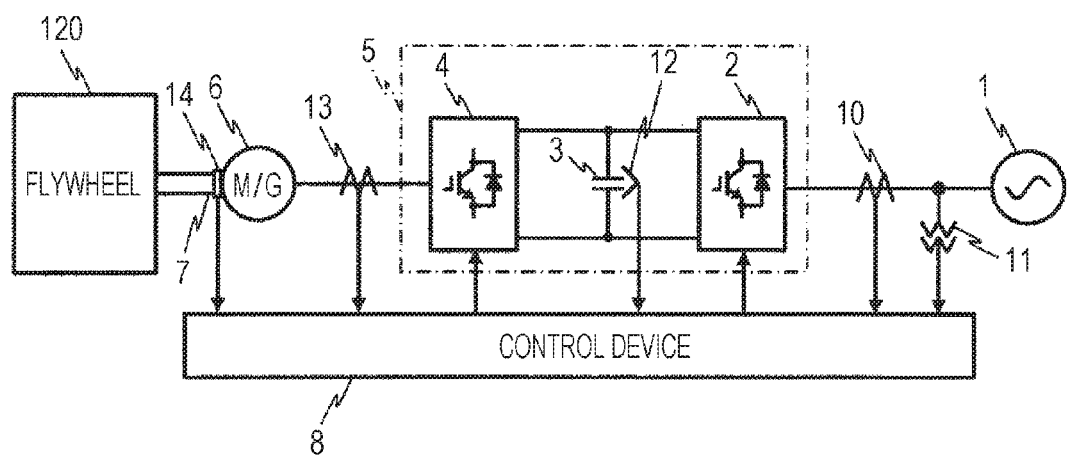
FIG. 7 is a diagram illustrating an exemplary configuration of a flywheel power generation system according to a seventh embodiment of the present invention.

FIG. 7 is a diagram illustrating an exemplary configuration of the flywheel power generation system according to the seventh embodiment of the present invention.

In FIG. 7, an AC power supply 1, a converter 2, a capacitor 3, an inverter 4, a rotary electric machine 6, a rotating shaft 7, current detection sensors 10 and 13, voltage detection sensors 11 and 12, and a rotation speed detection sensor 14 are the same as the constituent elements denoted by the same reference numerals in FIG. 1.

Furthermore, a control device 8 corresponds to the control device 8A in FIG. 1.

A flywheel 120 in FIG. 7 is driven by the rotary electric machine 6 via the rotating shaft 7 and is an object having inertial energy for storing or generating power. The flywheel 120 may have other functions, in addition to being used to store or generate power.

The flywheel power generation system according to the seventh embodiment illustrated in FIG. 7 can input and output the inertial energy of the flywheel 120 to and from the AC power supply 1 via the rotary electric machine 6 and the power converter 5 by controlling a torque or the number of revolutions of the rotary electric machine 6 driven by the power converter 5.

By controlling the torque or the number of revolutions of the rotary electric machine 6, the flywheel power generation system is likely to stop when vibration greatly occurs at the natural frequency of the driving system of the rotary electric machine 6, the rotating shaft 7, and the flywheel 120. Therefore, there is a need to suppress the vibration of the driving system.

Furthermore, when there is the fluctuation in the AC power input to and output from the AC power supply, the power quality of the AC power supply deteriorates and therefore, there is a need to suppress the power fluctuation.

As to the above requirements and necessity, by using the control devices 8A to 8D of a power converter according to the first to fourth embodiments of the present invention, it is possible to provide the flywheel power generation system having high reliability and power quality, in which the vibration due to the natural frequency of the driving system and the fluctuation of the AC power input and output to and from the AC power supply are suppressed.

<<Detection of Rotation Speed>>

The first embodiment of the present invention has described that the rotation speed detection sensor 14 detects the signal of the rotation speed input to the vibration suppression controller 83. However, the rotation speed is not necessarily detected by the rotation speed detection sensor. As long as there is provided the function of detecting the rotation speed, the rotation speed information may also be estimated from the current value detected by the current detection sensor and the voltage command.

What is claimed is:

1. A control device of a power converter for controlling a system including a converter that converts alternating current (AC) power of a power supply into direct current (DC) power, an inverter that converts the DC power into AC power, a capacitor that is installed between the converter and the inverter and is charged with and discharges the DC power, and a rotary electric machine that is driven by the AC power supplied from the inverter or regenerates the AC power to the power supply through the inverter and the converter, the control device comprising:
    an inverter control unit that controls the inverter;
    a converter control unit that controls the converter;
    a vibration suppression control unit that calculates a vibration correction value for canceling an axial vibration component due to a vibration frequency of a transmission system including the rotary electric machine; and
    an output compensation control unit that calculates a fluctuation correction value for suppressing AC power of the power supply fluctuated by the vibration suppression control unit,
    wherein the inverter control unit is configured to be operated based on a command value corrected by the vibration correction value and the converter control unit is configured to be operated based on a command value corrected by the fluctuation correction value.

2. The control device of a power converter according to claim 1, wherein the output compensation control unit outputs, as the fluctuation correction value, a correction value for suppressing a deviation between a power command and power input and output by the power supply to the converter control unit.

3. The control device of a power converter according to claim 1, wherein the output compensation control unit calculates, as the fluctuation correction value, a correction value based on a signal for suppressing a fluctuation of AC power between the inverter and the rotary electric machine.

4. The control device of a power converter according to claim 1, further comprising:
    a voltage detection sensor that outputs a voltage of the capacitor as a voltage detection value,
    wherein the inverter control unit outputs a command based on the voltage detection value.

5. The control device of a power converter according to claim 1, wherein the converter control unit includes a voltage control unit that outputs a voltage command and a current control unit that outputs a current command according to the voltage command, and the voltage control unit performs control based on the fluctuation correction value.

6. A power conversion system including a converter that converts AC power of a power supply into DC power, an inverter that converts the DC power into AC power, a capacitor that is installed between the converter and the inverter and is charged with and discharges the DC power, and a rotary electric machine that is driven by the AC power supplied from the inverter or regenerates the AC power to the power supply through the inverter and the converter, the power conversion system comprising:
- an inverter control unit that controls the inverter;
- a converter control unit that controls the converter;
- a vibration suppression control unit that calculates a vibration correction value for canceling an axial vibration component due to a vibration frequency of a transmission system including the rotary electric machine; and
- an output compensation control unit that calculates a fluctuation correction value for suppressing AC power of the power supply fluctuated by the vibration suppression control unit,
- wherein the inverter control unit is configured to be operated based on a command value corrected by the vibration correction value and the converter control unit is configured to be operated based on a command value corrected by the fluctuation correction value.

7. A compressor driving system including the power conversion system according to claim 6, comprising:
- a compressor using the rotary electric machine as a power source.

8. A flywheel power generation system including the power conversion system according to claim 6, comprising:
- a flywheel using the rotary electric machine as a power source,
- wherein the rotary electric machine is driven by the power converter or regenerates power to the power converter.

9. A control method for a power converter for controlling a system including a converter that converts AC power of a power supply into DC power, an inverter that converts the DC power into AC power, a capacitor that is installed between the converter and the inverter and is charged with and discharges the DC power, and a rotary electric machine that is driven by the AC power supplied from the inverter or regenerates the AC power to the power supply through the inverter and the converter, the control method comprising:
- calculating, by a vibration suppression control unit, a vibration correction value for canceling an axial vibration component due to a vibration frequency of a transmission system including the rotary electric machine;
- controlling, by an inverter control unit, the inverter based on a command value corrected by the vibration correction value;
- calculating, by an output compensation control unit, a fluctuation correction value for suppressing AC power of the power supply fluctuated by the vibration suppression control unit; and
- controlling, by a converter control unit, the converter based on a command value corrected by the fluctuation correction value.

* * * * *